No. 741,701. PATENTED OCT. 20, 1903.
J. O'CONNOR.
NUT LOCK.
APPLICATION FILED AUG. 6, 1903.
NO MODEL.

Witnesses:
W. C. Zingle
P. A. Hickey

Inventor:
Jeremiah O'Connor
By F. G. Fischer
Atty.

No. 741,701.

Patented October 20, 1903.

UNITED STATES PATENT OFFICE.

JEREMIAH O'CONNOR, OF LEAVENWORTH, KANSAS.

NUT-LOCK.

SPECIFICATION forming part of Letters Patent No. 741,701, dated October 20, 1903.

Application filed August 6, 1903. Serial No. 168,418. (No model.)

*To all whom it may concern:*

Be it known that I, JEREMIAH O'CONNOR, a citizen of the United States, residing at Leavenworth, in the county of Leavenworth and State of Kansas, have invented certain new and useful Improvements in Nut-Locks, of which the following is a specification.

My invention relates to improvements in nut-locks; and my object is to produce a positive lock for permanently securing nuts upon bolts so the nut cannot work off or be removed from the bolt without cutting it off or mutilating the bolt. By thus providing a positive lock the device is rendered especially desirable for securing fish-plates to railway-rails, for bridge construction, and for other structures of a permanent nature where it is necessary to secure the joints against accidental parting.

The invention consists in a bolt provided with a longitudinal groove having a spring secured therein, a nut having one or more grooves adapted to register with the groove in the bolt, and a key adapted to be inserted in the registering grooves and provided with a shoulder at its inner end for engagement with the free end of the spring whereby the key is permanently secured in said registering grooves and prevents the nut from turning on the bolt.

In order that the invention may be fully understood, reference will now be made to the accompanying drawings, in which—

Figure 1:
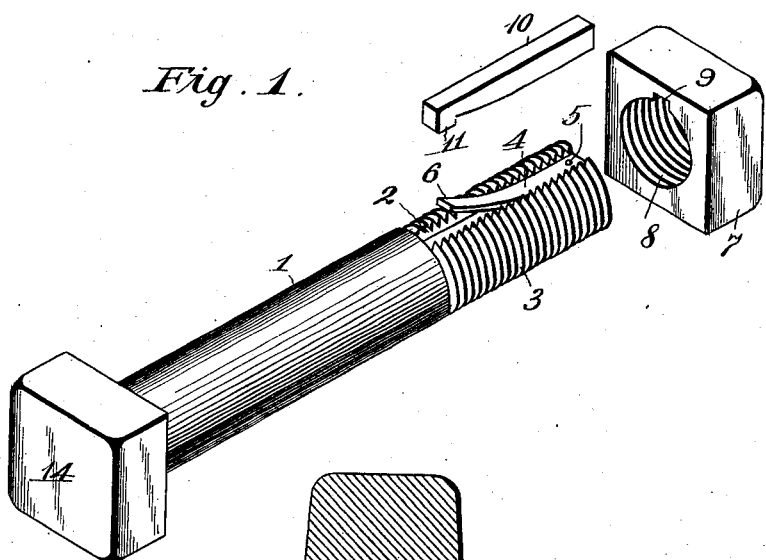
Figure 2:
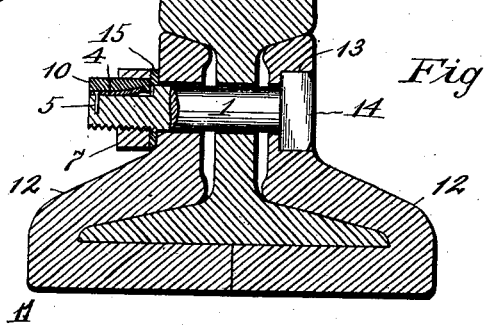
Figure 3:
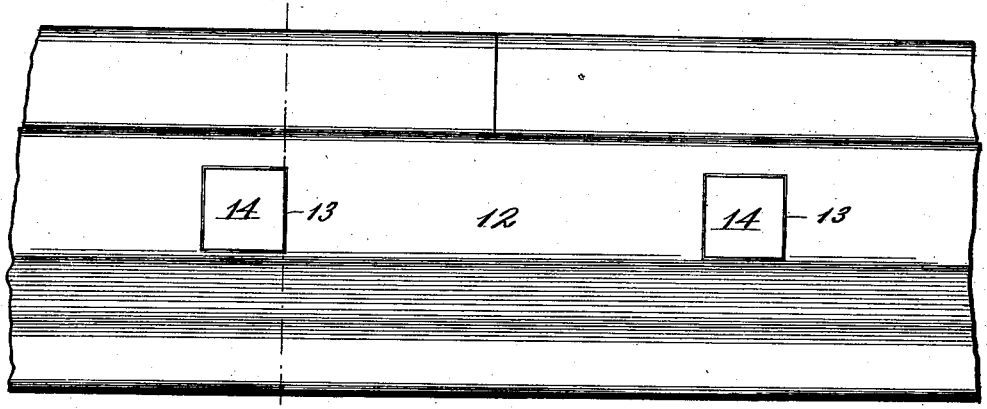

Figure 1 represents a perspective view of my improved nut-lock with the several parts detached. Fig. 2 is a transverse sectional view taken on line II II of Fig. 3, showing a pair of fish-plates secured to a rail-joint by my improved nut-lock. Fig. 3 is a broken side elevation of the same.

Similar reference-numerals designate similar parts throughout the several views.

1 designates a bolt provided with a longitudinal groove 2, extending the length of its threaded portion 3 and provided with a spring 4. Said spring is secured in the outer end of the groove by a pin 5, and its free inner upturned end 6 extends inwardly within a short distance of the inner terminal of the groove.

7 designates a nut having internal threads 8 for engaging threads 3 and a transverse groove 9, communicating with its internally-threaded portion.

10 designates a key of about the same length as groove 2 and provided at its inner end with a shoulder 11, adapted when in position to engage the inner end of the spring and occupy the space between said inner end and the adjacent end of groove 2.

When applied to fish-plates 12, (see Figs. 2 and 3,) one of the latter is preferably provided with recesses 13 for receiving heads 14 of the bolts to prevent the latter from rotating. The nuts are then applied to the threaded end of the bolts and screwed up against the opposite fish-plate. Should groove 9 fail to register with groove 2 after the nut has been tightened against the fish-plate, the nut is removed and one or more washers 15 are interposed between the nut and the fish-plate. Key 10 is then inserted in the registering grooves until shoulder 11 engages the inner upturned end 6 of the spring, when the nut will be permanently locked upon the bolt, so that it will be impossible to remove it without mutilating it or the bolt.

Although I have shown but one groove in the bolt and one in the nut, it is obvious that a greater number could be employed without departing from the spirit or scope of the invention.

Having thus described my invention, what I claim, and desire to secure by Letters Patent, is—

1. A bolt provided at its threaded end with a longitudinal groove, a spring secured in said groove, an internally-threaded nut provided with a groove adapted to register with the groove in the bolt, a key adapted to be inserted in the registering grooves, and a shoulder on the inner end thereof adapted to engage the inner end of the spring.

2. A bolt provided with a groove extending the full length of its threaded portion, a spring secured at its outer end in the groove and extending upwardly and inwardly within a short distance of the inner terminal of said groove, an internally-threaded nut provided with a transverse groove adapted to register with the groove in the bolt, a key adapted to be inserted in the registering grooves, and a shoulder on the inner end of said key adapted to engage the inner upturned end of the spring and approximately fill the space between said end and the inner end of the groove in the bolt.

In testimony whereof I affix my signature in the presence of two witnesses.

JEREMIAH O'CONNOR.

Witnesses:
F. G. FISCHER,
T. A. HICKEY.